Nov. 10, 1959 H. H. WIELAND 2,911,700
SEPARABLE MOUNTINGS FOR ELECTRIC MOTORS OR THE LIKE
Filed June 22, 1954 3 Sheets-Sheet 1
FIG. 1
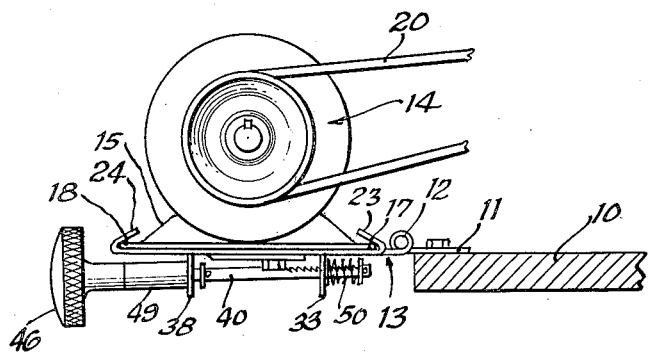
FIG. 2
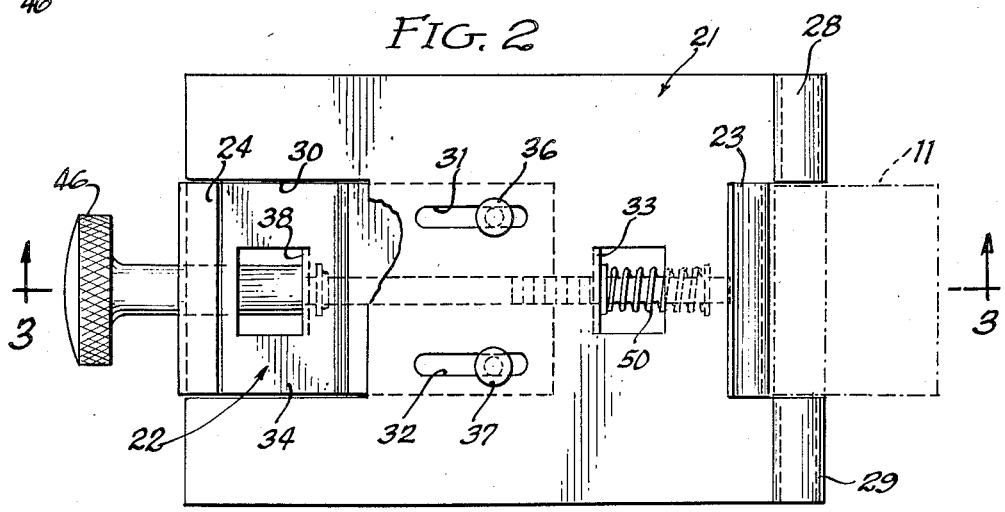
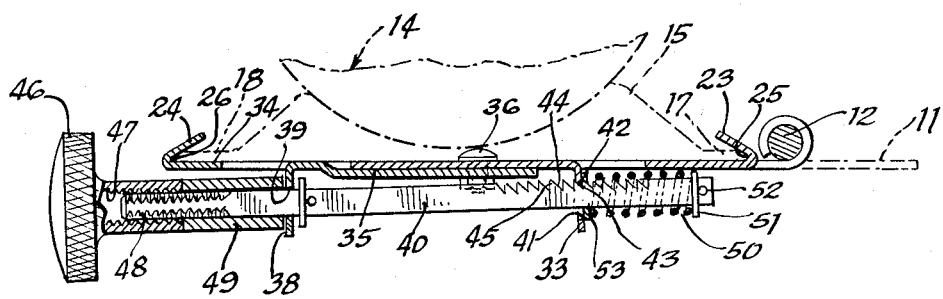
FIG. 3
INVENTOR.
Harry H. Wieland
BY
Atty Nov. 10, 1959  H. H. WIELAND  2,911,700
SEPARABLE MOUNTINGS FOR ELECTRIC MOTORS OR THE LIKE
Filed June 22, 1954  3 Sheets-Sheet 2
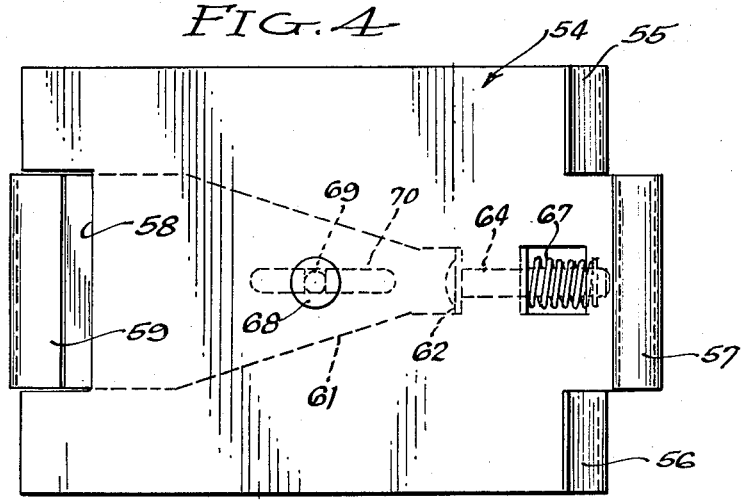
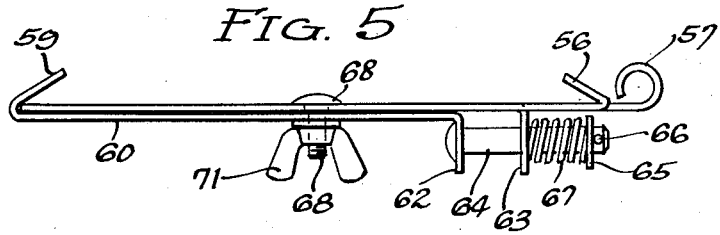
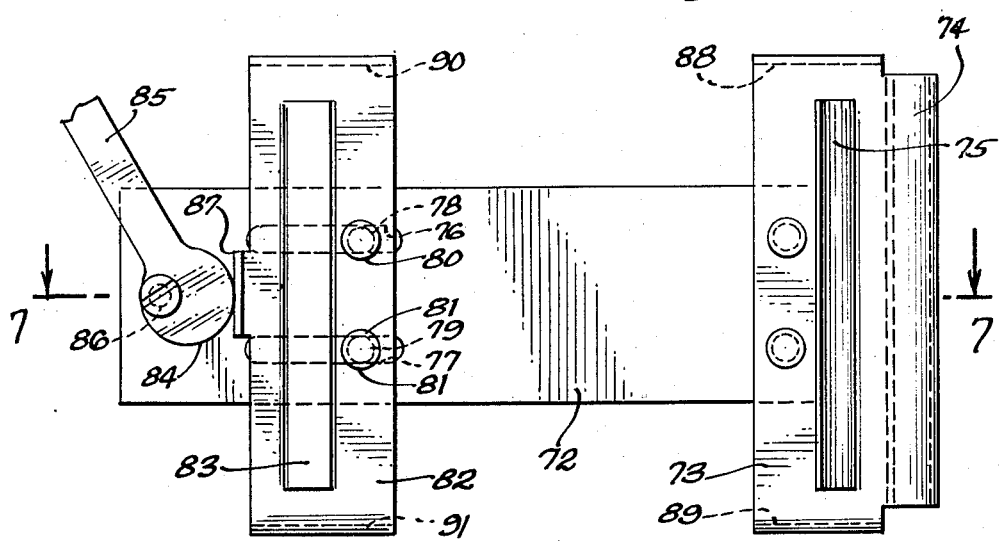
INVENTOR.
Harry H. Wieland
BY
ATT'y

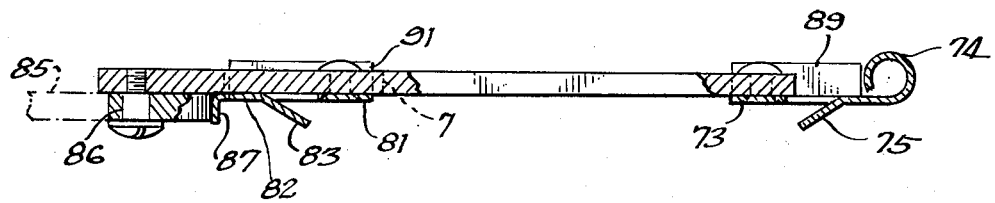
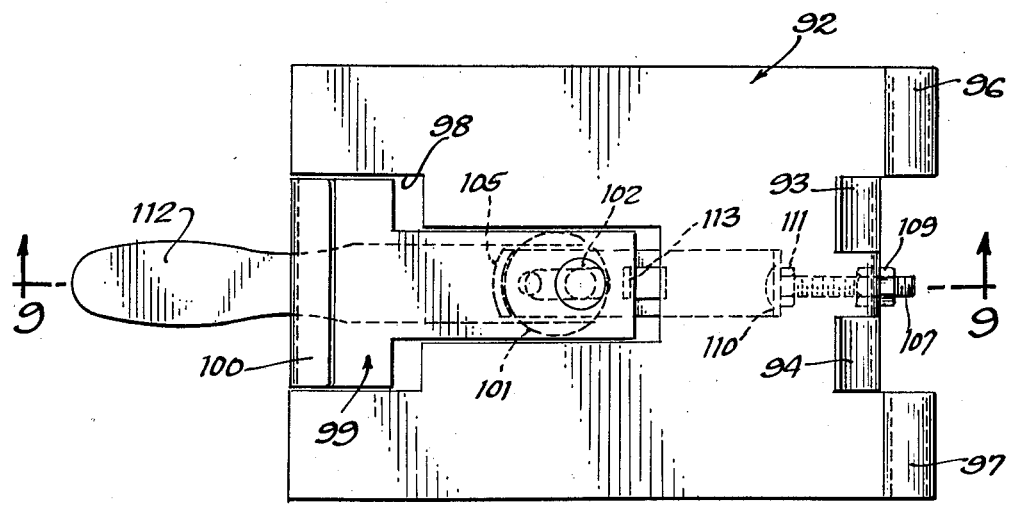
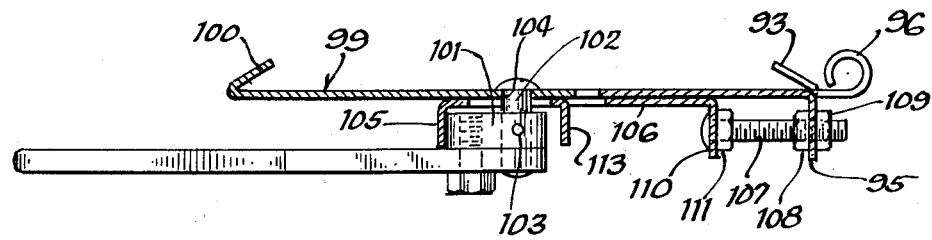

United States Patent Office 2,911,700
Patented Nov. 10, 1959

2,911,700

SEPARABLE MOUNTINGS FOR ELECTRIC MOTORS OR THE LIKE

Harry H. Wieland, Chicago, Ill., assignor to Duro Metal Products Co., Chicago, Ill., a corporation of Illinois Application June 22, 1954, Serial No. 438,388

4 Claims. (Cl. 24—263)

This invention relates to a readily detachable motor mounting for relatively small electric motors such as are used to supply the power for woodworking tools and other devices requiring less than one horsepower.

It has been proposed to provide a woodworking shop comprised of a plurality of individual tools such as a circular saw, a lathe, a drill press and a band saw, each tool being complete with the exception of the electric motor used to drive it. It has been proposed further in connection with such a plurality of tools to furnish but one electric motor and to construct each of the individual tools in such manner that the one motor can be quickly removed from one tool and applied to any one of the other tools, thereby effecting a substantial reduction in the initial cost of a complete shop.

It is an object of this invention to provide an improved mounting for an electric motor or the like from which the motor is quickly and readily detachable, said mounting being adapted to cooperate with a standard motor base as supplied by the motor manufacturer.

Another object of this invention is the provision of a motor mounting which is in the form of a clamp adapted to receive within its jaws a standard base for an electric motor or the like as supplied by the motor manufacturer.

A more specific object of this invention is to provide a mounting for an electric motor or the like, the mounting taking the form of a clamp having quickly operable means for opening or closing the jaws of the clamp upon the base of an electric motor.

These and other objects of the invention will become apparent from the following detailed description when taken together with the accompanying drawings in which:

Fig. 1 is a side elevational view of a motor and a mounting therefor, the latter being made in accordance with this invention;

Fig. 2 is an enlarged plan view of the motor mounting of Fig. 1;

Fig. 3 is a side elevational view of the mounting of Fig. 2 in section, the section being taken along line 3—3 thereof;

Fig. 4 is a plan view of a modification of the mounting of Figs. 1 to 3, said modification employing a more direct type of clamping means;

Fig. 5 is a side elevational view of the mounting of Fig. 4;

Fig. 6 is a bottom view of a second modification of the mounting of the Figs. 1 to 3, said second modification incorporating a cam type clamping means and being particularly adapted to support a motor in an inverted position;

Fig. 7 is a side elevational view of the mounting of Fig. 6 in section, the section being taken along line 7—7 thereof;

Fig. 8 is a plan view of a third modification of the mounting of Figs. 1 to 3 showing another form of cam operated locking means; and Fig. 9 is a side elevational view in section of the mounting of Fig. 8, the section being taken along line 9—9 thereof.

It is contemplated that the motor mounting of this invention will be a permanent part of the machine to which it is attached, and that each machine therefore will have one such motor mounting, with appropriate means for adapting the mounting to the movement required of the motor, if any, to keep a driving belt taut and to follow the movement of the tool driven thereby. Since such means is not a part of this invention, no disclosure thereof will be made herein.

Referring to Fig. 1, the machine frame on which the motor is to be supported is shown at 10 and it has secured thereto the fixed part 11 of a hinge of any suitable construction, said fixed part 11 having a hinge pin 12 by which the movable part 13 of the hinge is mounted for swinging movement relative to machine frame 10. Movable part 13 supports an electric motor 14 having a base 15 which terminates in spaced laterally extending flanges 17, 18 preferably disposed in the same flat plane. Motor 14 is supplied with a drive pulley 19 around which is passed a belt 20 for driving the tool (not shown) of the machine mounted on frame 10. Said tool may be a circular saw, a band saw, a lathe, a drill press or any similar tool. In the form shown in Fig. 1, motor 14 is mounted eccentrically of hinge pin 12 so that its weight may be utilized to keep belt 20 taut.

The details of construction of the movable part 13 of the hinge are shown more clearly in Figs. 2 and 3. Said movable part constitutes the motor mounting of this invention and is comprised in general of a relatively large rectangular plate 21 and a relatively small plate 22 mounted on plate 21 in a manner to allow plate 22 to move relatively to plate 21 in substantially the plane of plate 21. Each plate is provided with a flange 23 and 24, respectively, bent upwardly and then backwardly toward one another to form the jaws of a clamp. The inner corners 25 and 26 of flanges 23 and 24, respectively, are well rounded to provide space within which flanges 17 and 18 of motor base 15 may be received. The length of each flange 23, 24 is preferably such as to prevent cocking of the motor relative to plate 21 and instead to cause the motor to assume a predetermined fixed relationship with respect to the tool it is to drive each time the motor is mounted on plate 21.

The end regions of plate 21 on either side of flange 23 are curled as at 28, 29 to provide circular openings in which hinge pin 12 may be received. The fixed part 11 of the hinge extends into the space created by flange 23 between curled end regions 28 and 29.

Plate 21 has a notch 30 of rectangular form cut in the left hand central region thereof as viewed in Fig. 2, and a pair of slots 31, 32 disposed within the extended confines of the sides of notch 30 and with their longitudinal axes parallel to one another. An abutment 33 of rectangular form is struck downwardly from the right central region of plate 21 and cooperates with a latching means hereinafter to be described for locking plate 22 in a predetermined position relative to plate 21.

Plate 22 has a region 34 at the left-hand end thereof as viewed in Figs. 2 and 3 which is received within notch 30 and disposed in the same plane as plate 21. The right-hand region 35 of plate 22 is offset from the plane of plate 21 an amount approximately equal to the thickness of plate 21 and extends along the bottom of said plate 21. A pair of shoulder bolts 36, 37 extend downwardly through slots 31, 32 and through suitable openings in region 35 to hold plate 22 against plate 21 and to assist in guiding plate 22 in its lateral movement relative to plate 21.

An abutment 38 of rectangular form is struck downwardly from region 34 in plate 22, said abutment 38 being substantially parallel, and aligned, with abutment 33. A rectangular opening 39 is formed in abutment 38 to receive a rectangular rod 40. Abutment 33 is similarly formed with a rectangular opening 41 to receive the righ-hand end of rod 40 as viewed in Fig. 3, the upper surface 42 of opening 41 being bevelled to form a tooth having one side 43 normal to the axis of rod 40 and the other side at an acute angle with respect to side 43. The upper surface of rod 40 is formed with a plurality of teeth 44 having a front face 45 normal to the axis of rod 40 and a back face at an acute angle with respect thereto.

It may be observed from Fig. 3 that teeth 42 and 44 are arranged to take axial thrust when rod 40 tends to move to the left relative to abutment 33 and to ratchet over one another when the thrust is in the opposite direction. Thrust toward the left may be established by a knob 46 having an internally threaded bore 47 cooperating with external threads 48 on the left-hand end of rod 40. A bushing 49 is interposed between abutment 38 and the righthand end of knob 46. Turning knob 46 on threads 48 to advance the knob along rod 40 causes said rod 40 to move to the left as viewed in Fig. 3 until the normal faces 43 and 45 of teeth 42 and 44, respectively, contact one another, whereupon further rotation of knob 46 in the same direction causes abutment 38 to advance toward abutment 33. This in turn causes flange 24 to move toward flange 23 to effect the desired clamping action upon the flanges 18 and 17 of motor base 15.

An initial clamping action may be had by interposing a spring 50 between abutment 33 and a thrust washer 51 held in place on rod 40 by a pin 52. Since slot 41 is elongated a second thrust washer 53 may be interposed between abutment 33 and the end of spring 50 adjacent thereto to prevent spring 50 from passing through slot 41. The compression of spring 50 between thrust washers 51 and 53 exerts a thrust on rod 40 to the right to provide a means for quickly adjusting flange 24 relative to flange 23 for the motor involved. A final clamping action is then obtained by rotating knob 46 to advance the knob on rod 40 as aforesaid.

When it is desired to remove a motor from the movable part 13 of the mounting, knob 46 is rotated in a direction to back it off rod 40 and thereby limit the clamping action to that obtained from spring 50 alone. It is contemplated that spring 50 will be relatively light and hence will not develop sufficient friction between teeth 42 and 44 to resist a downward movement of rod 40 relative to abutment 33 in slot 41 to free teeth 44 from teeth 42. Such downward movement of rod 40 may be effected by pulling upwardly on knob 46, using the upper wall of the rectangular opening 39 in abutment 38 as a fulcrum. When the teeth 44 have been disengaged from teeth 42, knob 46 may be pulled to the left as viewed in Fig. 3 until one of the flanges 24 or 23 is clear of the flange 18 or 17 of the motor base 15. Motor 14 may then be lifted off the mounting and moved to another machine if so desired.

In Figs. 4, 5 and 6 there is shown a modification of a movable part 13 of the mounting of Figs. 1, 2 and 3. To avoid unnecessary repetition the motor is not shown in Figs. 4, 5 and 6.

The mounting shown in Fig. 4 is comprised of a substantially rectangular plate 54 having a pair of laterally spaced flanges 55 and 56 bent upwardly from the right-hand side thereof as viewed in Fig. 4. The portion between flanges 55 and 56 is curled upwardly as shown at 57 to form the intermediate portion of a hinge of the type shown in Fig. 1. The flanges 55 and 56 are bent upwardly and backwardly on plate 54 at an acute angle with respect to the upper surface of said plate 54.

The left-hand side of plate 54 as viewed in Fig. 4 has a substantially rectangular notch 58 cut in the central region thereof through which is adapted to project a flange 59 bent upwardly and backwardly from a slidable clamping plate 60 disposed below plate 54. Clamping plate 60 has sides 61 converging toward the right-hand end thereof which terminates in a downwardly turned lug 62 disposed substantially at right angles to the general plane of plate 60. Spaced from lug 62 and substantially parallel thereto is a second lug 63 struck downwardly from plate 54. Lugs 62 and 63 have aligned openings therein through which passes a pin 64 having a thrust washer 65 retained by a pin 66 spaced from lug 63. A spring 67 is compressed between thrust washer 65 and lug 63 and urges pin 64 and lug 62 to the right as viewed in Fig. 5.

The movement of plate 60 to the right under the action of spring 67 upon pin 64 and lug 62 is guided by a bolt 68 having a substantially square shank 69 passing through an elongated slot 70 formed in plate 60, the long axis of slot 70 being substantially aligned with or parallel to the axis of pin 64. A wing nut 71 may be used to draw plate 60 against plate 54 to lock the two plates together.

It is contemplated that motor 14 will be inserted between flanges 56 and 59 with its base flanges 17 and 18 retained within and against flanges 56 and 59, respectively. The motor is clamped in place by manually drawing flanges 56 and 59 together with the assistance of spring 67, and then tightening wing nut 71. To remove a motor from plate 54, wing nut 71 is first loosened and then the motor is slid to the left as viewed in Fig. 5 against flange 59 to move said flange 59 away from flange 56 until the motor base flange 17 clears flange 56, whereupon the motor is swung upwardly to clear flange 56 and then removed.

Figs. 6 and 7 show a second modification of the hinged motor mounting of Fig. 1 wherein a cam device is used to obtain a faster clamping action and wherein spring means have been eliminated for securing an initial clamping action. In the form shown in Figs. 6 and 7, a relatively heavy rectangular plate 72 is utilized as the basic framework for the mounting upon the right-hand end of which, as viewed in Fig. 6, is riveted or otherwise secured, a stamping 73 which extends beyond the top and bottom edges of plate 72. The right-hand region of stamping 73 is curled to form a hinge member 74 within which may be received a hinge pin such as 12 of Fig. 1. A flange 75 is struck downwardly from the central region of stamping 73 and is disposed at an acute angle with respect to the general plane of stamping 73.

Near the left-hand end of plate 72, as viewed in Fig. 6, are pierced two substantially parallel slots 76 and 77 through which pass pins 78 and 79 having heads 80 and 81 which are flush with the bottom surface of the stamping 82 and serve to hold said stamping for sliding movement relative to plate 72 parallel with the long axes of the slots 76 and 77. A flange 83 is struck downwardly from the central region of stamping 82 and is disposed at an acute angle with respect to the bottom surface thereof so as to be inclined toward flange 75. Thus, flanges 83 and 75 are adapted to receive flanges 17 and 18 of motor base 15 and, upon appropriate movement of flanges 83 and 75 toward one another, to clamp the motor base securely to plate 72.

The movement of stamping 82 toward stamping 73 is effected by an eccentric type cam 84 formed on the end of a hand lever 85 pivoted at 86 to plate 72. Cam 84 is adapted to cooperate with a flange 87 extending downwardly from the left-hand side of stamping 82 so that as lever 85 is oscillated about its pivot 86, flange 87 follows cam 84 and stamping 82 will be constrained to move toward stamping 73. The contour of cam 84 is such that when a motor base 15 is mounted between flanges 75 and 83 and lever 85 is turned until the base is firmly clamped between these flanges, the cam angle will not be sufficiently great to cause a reaction in the cam in a direction to release the motor. Thus, when the motor is securely clamped by turning lever 35 in a clockwise direction as viewed in Fig. 6, the motor will remain so clamped until lever 85 is turned in the opposite direction regardless of any vibration or shock which may be transmitted to the cam from the motor.

To provide stiffness for stampings 73 and 82, flanges 88, 89, 90 and 91 are bent downwardly from the top and bottom edges thereof.

The form shown in Figs. 6 and 7 may be used in the same manner as the form shown in Fig. 1, or it may be used to mount a motor in an inverted position. It may be noted that due to the use of flush type pins and rivets there is no projection extending outwardly from the mounting to interfere with the normal flat mounting of the motor base upon stampings 73 and 82.

The modification shown in Figs. 8 and 9 is similar to that shown in Figs. 4 and 5 with the addition thereto of the cam locking lever of Figs 6 and 7. The mounting is comprised of a substantially rectangular plate 92 having the right-hand edge region (Fig. 8) bent upwardly and backwardly over the plate to form a pair of clamping flanges 93, 94 and the central region struck downwardly to form a tab 95. The outer end regions are curled to form spaced hinge parts 96, 97 through which may be passed a hinge pin such as pin 12 of Figs. 1 and 3. The left central region of plate 92 has a T-shaped notch 98 cut therein to receive a correspondingly shaped stamping 99 which constitutes the movable element of the mounting. The left-hand edge of stamping 99 is bent upwardly and backwardly to form a clamping flange 100 which is inclined toward flanges 93 and 94. A motor base 15 (Fig. 1) is adapted to be clamped between flanges 100 and 93 and 94.

Movement of stamping 99 toward flanges 93, 94 is effected by a cam 101 secured to a pivot pin 102 by a pin 103, said pivot pin being rotatable in an opening 104 in the stem of the T-shaped stamping 99. The cam 101 is adapted to contact a flange 105 depending from a flat substantially rigid strip 106 secured to tab 95 by a bolt 107 locked in place by nuts 108, 109. Bolt 107 is fixed by a nut 111 to a tab 110, depending from the right-hand end (Fig. 9) of strip 106. Cam 101 is bolted to a hand lever 112 extending to the left of the cam.

It may be apparent that movement of clamping flange 100 toward flanges 93, 94 may be effected by turning cam 101 about the axis of pin 102. Thus, to install a motor on the mounting plate 92, lever 112 is swung out of the position it occupies in Figs. 8 and 9 and at the same time a force is exerted on the lever in a manner to cause pin 102 to be pulled to the left to separate flanges 100 and 93, 94. After the motor is placed on plate 92 with its flanges 17, 18 (Fig. 1) disposed within the space defined by flanges 93, 94 and 100, lever 112 is swung toward the position shown in Fig. 8. This movement of lever 112 causes cam 101 to rotate about the axis of pin 102 and contact flange 105 on strip 106. Since flange 105 is fixed, the movement of the cam against flange 105 results in a movement of pin 102 and its associated stamping 99 and clamping flange 100 toward flanges 93, 94, thereby effecting a clamping action against the motor mounting. The shape of cam 101 and the friction developed between the cam and flange 105 are such as to resist turning of the cam in a direction to relieve the clamping action.

To assist in separating the clamping flange 100 from flanges 93, 94, a tab 113 is struck downwardly from strip 106 on the side of cam 101 opposite the side on which flange 105 is disposed, the tab being contacted by cam 101 when lever 112 is swung from the position it occupies in Fig. 8. Continued movement of the lever from the position shown causes a positive movement of pin 102 away from tab 113 and a resulting movement of flange 100 away from flanges 93, 94.

Each of the forms of mounting described above provides a means for securing a motor to a machine without the aid of special attachments applied to the motor itself.

The mountings may all be hinged to allow a belt tightening action to be produced by the weight of the motor. The shape of the mounting and of the flanges may be varied to suit special motor base shapes. Since the mountings are a permanent part of each machine, they can be made to conform to the particular requirements of the machine to which they are attached.

It is understood that the foregoing description is illustrative of preferred embodiments of the invention and that the scope of the invention therefore is not to be limited thereto but is to be determined by the appended claims.

I claim:

1. A mounting for a motor having spaced laterally extending attaching flanges, said mounting comprising a first plate having a fixed abutment extending upwardly from and backwardly over the surface thereof and adapted to be contacted by the edge of one of said laterally extending attaching flanges, said plate having further a notch formed therein extending inwardly from an edge of the plate removed from the said fixed abutment thereon, a second plate, means for supporting the second plate from the first plate for movement toward and away from the said fixed abutment, a second abutment extending upwardly from the surface of the second plate through the notch and adapted to contact the edge of the attaching flange opposite the said one of said laterally extending attaching flanges, resilient means for moving the second plate toward the said fixed abutment, and means for clamping the attaching flanges between the said fixed and second abutments; said means for moving the second plate toward the fixed abutment comprising a rod having its longitudinal axis disposed in the direction of movement of the second plate, means on the first plate having an opening therethrough to receive and guide one end of the rod, an abutment on the rod, and a spring compressed between the said rod receiving and guiding means and the abutment on the rod; and said clamping means comprising screw means on the opposite end of the rod, threaded means cooperating with the screw means and movable thereon, and means for transmitting the movement of the threaded means to the said second plate.

2. A mounting for a motor having spaced laterally extending attaching flanges, said mounting comprising a first plate having a fixed abutment extending upwardly from and backwardly over the surface thereof and adapted to be contacted by the edge of one of said laterally extending attaching flanges, said plate having further a notch formed therein extending inwardly from an edge of the plate removed from the said fixed abutment thereon, a second plate, means for supporting the second plate from the first plate for movement toward and away from the said fixed abutment, a second abutment extending upwardly from the surface of the second plate through the notch and adapted to contact the edge of the attaching flange opposite the said one of said laterally extending attaching flanges, resilient means for moving the second plate toward the said fixed abutment, and means for clamping the attaching flanges between the said fixed and second abutments; said means for moving the second plate toward the fixed abutment comprising a rod disposed below said plates, apertured tabs struck downwardly from each plate, said rod passing through the apertures in both tabs, in abutment on one end of the rod and a spring compressed between the tab on the said first plate and the abutment on the rod; and said clamping means comprising cooperating ratchet means on the rod and said first plate for holding the rod against movement relative to said first plate, screw means on the rod spaced from the ratchet means, threaded means cooperating with the screw means and movable thereon and means for transmitting the movement of the threaded means to the said second plate.

3. A mounting as described in claim 2, said threaded means comprising a knob threaded on said screw means on the rod, and said means for transmitting the movement of the knob to the tab on the second plate comprising a collar disposed on the rod between the knob and the tab on the second plate.

4. A mounting for a motor having laterally extending attaching flanges, said mounting comprising a substantially rectangular plate having an upwardly and backwardly disposed flange at one end thereof, and having a substantially rectangular notch in the opposite end thereof, a plate disposed in said notch and having an offset region passing under the first mentioned plate in overlapping relation therewith, an upwardly and forwardly directed flange on the second plate, said flanges on the first and second plates defining elongated pockets in which may be received the attaching flanges of the motor, a downwardly struck tab on each plate, each tab being apertured, a rod passing through the apertures in both tabs and extending to either side of each tab so as to have the ends thereof substantially free, an abutment on the end of the rod adjacent the tab on the first mentioned plate, a spring compressed between the rod abutment and the said tab on the first mentioned plate to move the plates and their upwardly extending flanges toward one another, toothed means on the rod adapted to cooperate with one of said tabs to prevent movement of the rod relative to said tab in one direction, threads on the free end of the rod opposite the toothed means, a knob threaded on the threaded end of the rod, a bushing interposed between the knob and the tab struck downwardly from the second plate, and pin-and-slot means for supporting the second plate from the first plate, said knob when rotated being effective to draw one plate and its flange toward the other plate and its flange to effect a clamping action upon the attaching flanges for the motor.

References Cited in the file of this patent
UNITED STATES PATENTS

| | | |
|---|---|---|
| 1,349,225 | Rosenblum | Aug. 10, 1920 |
| 1,382,162 | Beach | June 21, 1921 |
| 1,884,370 | Swanson | Oct. 25, 1932 |
| 2,498,392 | Boyle | Feb. 21, 1950 |
| 2,669,404 | Howard | Feb. 16, 1954 |
| 2,675,986 | Fisher | Apr. 20, 1954 |

FOREIGN PATENTS

| | | |
|---|---|---|
| 326,356 | Germany | Sept. 27, 1920 |
| 365,861 | Germany | Dec. 29, 1922 |